(12) United States Patent
Webster (10) Patent No.: US 7,703,433 B2
(45) Date of Patent: Apr. 27, 2010

(54) ROTARY INTERNAL COMBUSTION ENGINE AND ROTARY COMPRESSOR

(76) Inventor: Richard Colman Webster, 2058 Dove Ct., Corona, CA (US) 92882

(*) Notice: Subject to any disclaimer, the term of this patent is extended or adjusted under 35 U.S.C. 154(b) by 103 days.

(21) Appl. No.: 12/072,366

(22) Filed: Feb. 26, 2008

(65) Prior Publication Data

US 2008/0202466 A1 Aug. 28, 2008

Related U.S. Application Data

(60) Provisional application No. 60/903,929, filed on Feb. 28, 2007.

(51) Int. Cl.
*F02B 53/04* (2006.01)
*F01C 1/08* (2006.01)
*F01C 1/24* (2006.01)
*F04C 18/00* (2006.01)
*F04C 2/00* (2006.01)

(52) U.S. Cl. .................. 123/221; 418/196; 418/207

(58) Field of Classification Search .............. 123/221, 123/223, 238, 200, 241, 243, 244; 418/195–196, 418/207
See application file for complete search history.

(56) References Cited

U.S. PATENT DOCUMENTS

| | | | | |
|---|---|---|---|---|
| 889,439 A * | 6/1908 | Carter | | 418/195 |
| 990,665 A * | 4/1911 | Norin | | 418/195 |
| 1,012,616 A * | 12/1911 | Dubus | | 418/195 |
| 1,305,133 A * | 5/1919 | Little | | 418/195 |
| 1,352,237 A * | 9/1920 | Andrews et al. | | 418/195 |
| 1,619,514 A * | 3/1927 | Holman | | 418/195 |
| 1,785,140 A * | 12/1930 | Morris | | 418/195 |
| 2,674,982 A * | 4/1954 | McCall | | 123/221 |
| 2,779,318 A * | 1/1957 | Strader | | 418/195 |
| 3,073,288 A * | 1/1963 | Moriarty | | 418/195 |
| 5,758,501 A | 6/1998 | Jirnov et al. | | |
| 6,250,279 B1 | 6/2001 | Zack | | |
| 6,530,357 B1 | 3/2003 | Yaroshenko | | |
| 6,895,923 B1 | 5/2005 | Jones | | |
| 6,978,758 B2 | 12/2005 | Elmer | | |
| 2002/0023597 A1 | 2/2002 | Lillbacka | | |
| 2005/0132999 A1* | 6/2005 | Martin et al. | | 123/221 |

* cited by examiner

*Primary Examiner*—Thomas E Denion
*Assistant Examiner*—Mary A Davis
(74) *Attorney, Agent, or Firm*—Buhler & Associates; Kirk A. Buhler (57) ABSTRACT

The rotary internal combustion engine is a rotary internal combustion engine that uses the unique combination of multiple rotors on a vertical axis with piston vanes, which are intersected by horizontally oriented valve rings so that rotating rotors intersect gaps on the rotating valve rings, thus creating the intake compression and power and exhaust cycles on this internal combustion engine. The unique design allows the motor to operation as either a motor or pump. High volume of compressed air virtually eliminates the need for a storage tank. These engines are an elegant solution that fulfills the century long quest for quiet, clean, highly efficient rotary power. When available, the demand for the benefits of rotary piston power in air, surface, and marine applications, will be immediate and rewarding.

10 Claims, 7 Drawing Sheets

ROTARY INTERNAL COMBUSTION ENGINE AND ROTARY COMPRESSOR

CROSS REFERENCE TO RELATED APPLICATION

This application claims the benefit of Provisional 60/903,929 filed Feb. 28, 2007 the entire contents of which is hereby expressly incorporated by reference herein.

DESCRIPTION

FIELD OF THE INVENTION

This invention relates to improvements in a rotary engine or pump. More particularly, the present rotary engine or pump uses a pair of opposed rotors with vanes that pass though the rotors. The two vanes are on opposite sides of the rotor core and the rotor case which closely contains the core and vanes which rotate over the top and to the center. The disk rotates horizontally at the same RPM as the rotor to compress gas for combustion. The combustion continues to push the vanes to generate power. When the engine is driven air is compressed with the vanes to turn the engine into a air compressor.

BACKGROUND OF THE INVENTION

Piston engines pay a high price of energy lost to reciprocal motion. A piston accelerates, de-accelerates, stops and reverses direction with each stroke. The efficiency of piston compressors and combustion engines would be ideally enhanced if the momentum of machine mass and gas flow could be conserved. However, pistons reverse direction to define each stroke or cycle. Compressors reverse 2 times, engines reverse 4 times, to deliver a single power stroke. And it is this change of direction and velocity that nullifies the energy inherent to momentum. The inability to maintain momentum, CONSTANT velocity and direction, is expensive. The mechanical apparatus required to convert that linear motion into usable rotary motion using rods and crankshaft and the energy loss is substantial. Some patents have been issued for rotary type engines exemplary examples are presented herein.

U.S. Pat. No. 6,250,279 issued to Steven Zack on Jun. 26, 2001 discloses a Rotary Internal Combustion Engine using a series of annular surfaces with disk shaped pistons and an urging means to push the disks to the outer surface of the engine block. While this invention uses a rotary type engine there is still motion that pushes the disks towards and away from the engine block. This results in wasted energy and vibration. In addition the disks are maintained in position with springs that the explosion from the gas can overcome thereby creating an inefficient loss of power that is not present in the pending design.

U.S. Pat. No. 6,530,357 issued to Viktor Prokoflevich Yaroshenko on Mar. 11, 2003 discloses a Rotary Internal Combustion Engine using a hexagonal internal piston within an octagonal motor block where four sides of the motor block provide fuel/air mixture as well as exhaust. The remaining four sides provide sealing surfaces. While this patent provides a motor with rotary motion, the sealing surfaces move in and out thereby creating inefficiency and vibration.

U.S. Pat. No. 6,978,758 issued to Brent Warren Elmer on Dec. 27, 2005 discloses a High Efficiency Rotary Piston Combustion Engine. This engine operates similar to a turbine engine where air is compressed into the centrifugal cylinders where a spark plug ignites an air fuel mixture that turns the turbine to bring more compressed air into the motor. While this motor operates without any reciprocal motion the ignition of the gas does not take place in an enclosed chamber and some of the burned gas can escape back though the air intake system.

Published U.S. Patent Application US 2002/0023597 to Jorma Lillbaka, published on Feb. 28, 2002 discloses a valve less engine there the pistons rotate around an outer ring. The outer ring has holes that align with the top of the piston head. When the holes align the holes provide either intake exhaust functions to drive the piston(s). This application also requires the oscillating motion of the piston. The only advantage is the elimination of valves and the associated valve drive mechanism that is replaced with a rotary ring going around the piston(s).

What is needed is a motor design that uses intersection rings where the rings provide intake and exhaust function to fill the combustion chamber. The ideal motor would operate equally well as an air pump operating with similarly designed intersecting rings. The proposed rotary combustion engine provides this solution by taking the design of a conventional four stroke piston driven motor and bending the pistons and cylinder into a circular ring. The function of opening and closing the valves is accomplished by rings with slots that engage into the circular ring to open windows for these functions without using valves the move in and out.

BRIEF SUMMARY OF THE INVENTION

It is an object of the. No energy is lost to reciprocal motion or the apparatus required to convert linear motion into rotary motion as would be caused by the use of rods and crankshaft. All motion of these engines either external or internal combustion are purely circular and at a constant velocity. They operate in perfect balance at all times. Since constant, circular motion eliminates stress and vibration, these engines are particularly suited to high temperature operation which, with the low ratio of area to volume at the point of ignition, produces superior, more complete combustion for the highest energy to fuel ratio and hugely reduced pollutants. The use of ceramic compounds, with greater dimensional stability at high temperatures, would facilitate close tolerances, possibly without mechanical seals, that function being replaced by designer lubricants. Circulatory cooling systems would not be needed.

It is an object of the. Small area-to-volume ratio enables high temperature, high efficient combustion for high energy to fuel ratio and reduced pollutants. Each revolution of the motor provides 100% of displacement is power. Compare to 25% and 50% in 4 and 2 cycle cylinder engines.

It is another object. without the stress and vibration of reciprocating pistons and valves these engines are well suited to high temperature operation without cooling for maximum combustion efficiency. Ceramic compounds with greater dimensional stability would facilitate close tolerances without seals other than appropriate lubricants.

It is still another object of the. Internal combustion can be configures to operate on any gas or as a diesel engine. The internal combustion can be configured to operate on any fuel or as a diesel with a level of economy that will immediately reduce our dependency on imported petroleum and readily adapt to fuels and infrastructures of the future.

The external combustion engine can operate on gas or steam. Positive displacement permits efficient operation as applicably low RPM and replace turbines when lower RPMs are preferable.

Operation as either a motor or pump. Compressed air flow with minimal air flow eliminates the need for a storage tank in some applications. These engines are an elegant solution that fulfills the century long quest for quiet, clean, highly efficient rotary power. When available, the demand for the benefits of rotary piston power in air, surface, and marine applications, will be immediate and rewarding.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
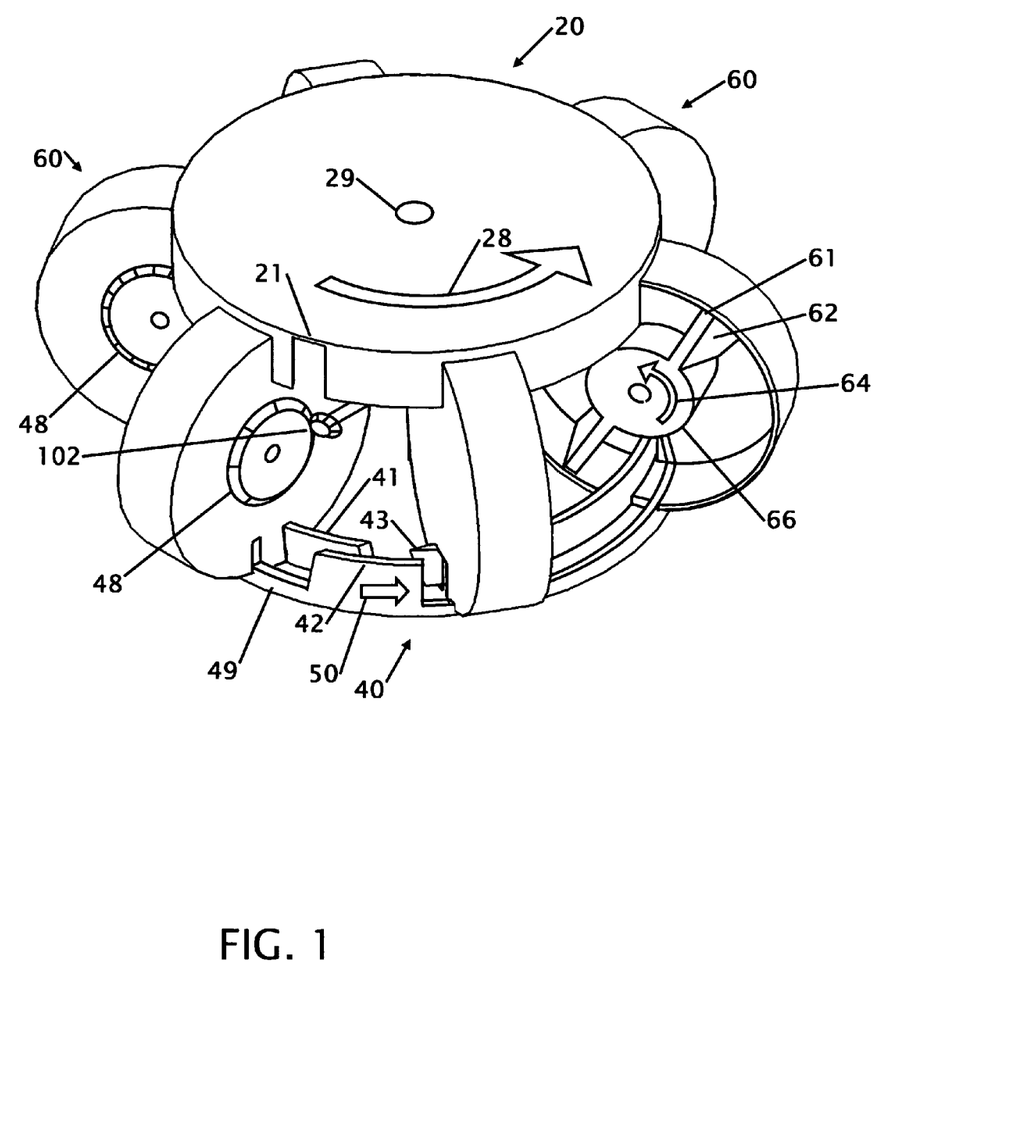
FIG. 1 shows an isometric cut away view of a six disk rotary internal combustion engine.

FIG. 1 shows an isometric cut away view of a six disk rotary internal combustion engine. The six rotors 60 are equally spaced around the center 29 at 60 degree intervals. A valve upper ring 20 is located on the top and above the six rotors 60. A lower valve ring 40 is located on the bottom or under the six rotors 60. The lower valve ring 40 has two raised rims where the inner rim is the head ring 41 and the outer rim is the compression ring 42 that are concentric. Each upper valve ring has two ring slots 21 located on opposite sides of the upper ring. The rim of the upper valve ring 20 and the ring slots 21 pass through each of the six rotors 60 to provide an opening for air intake and air exhaust. A more detailed description of the intake and exhaust is shown and described in FIG. 4-6. The rim of the lower valve ring 40 and the ring slots 49 and 43 pass through each of the six rotors 60 to provide an opening for the piston 61 located on the rotor to enter for compression and detonation with a spark plug or similar mechanism. A more detailed description of the intake and exhaust is shown and described in FIG. 7-9. The upper valve ring 20 is rotated 28 as the lower valve ring 40 rotates 50. These rings rotate in unison with the turning 64 rotor hub 66. The rotor 60 on the right side of this figure has the side closure removed to allow viewing of the internal rotor. The rotor includes a rotor hub 66 having two opposing pistons 61 with piston vanes 62 that extend from the hub 66. As the upper valve ring 20 and the lower valve ring 40 rotate a geared drive mechanism having a spur gear 102 turns the rotor gear 48. The gear mechanism is shown and described in more detail with FIG. 2.

Figure 2:
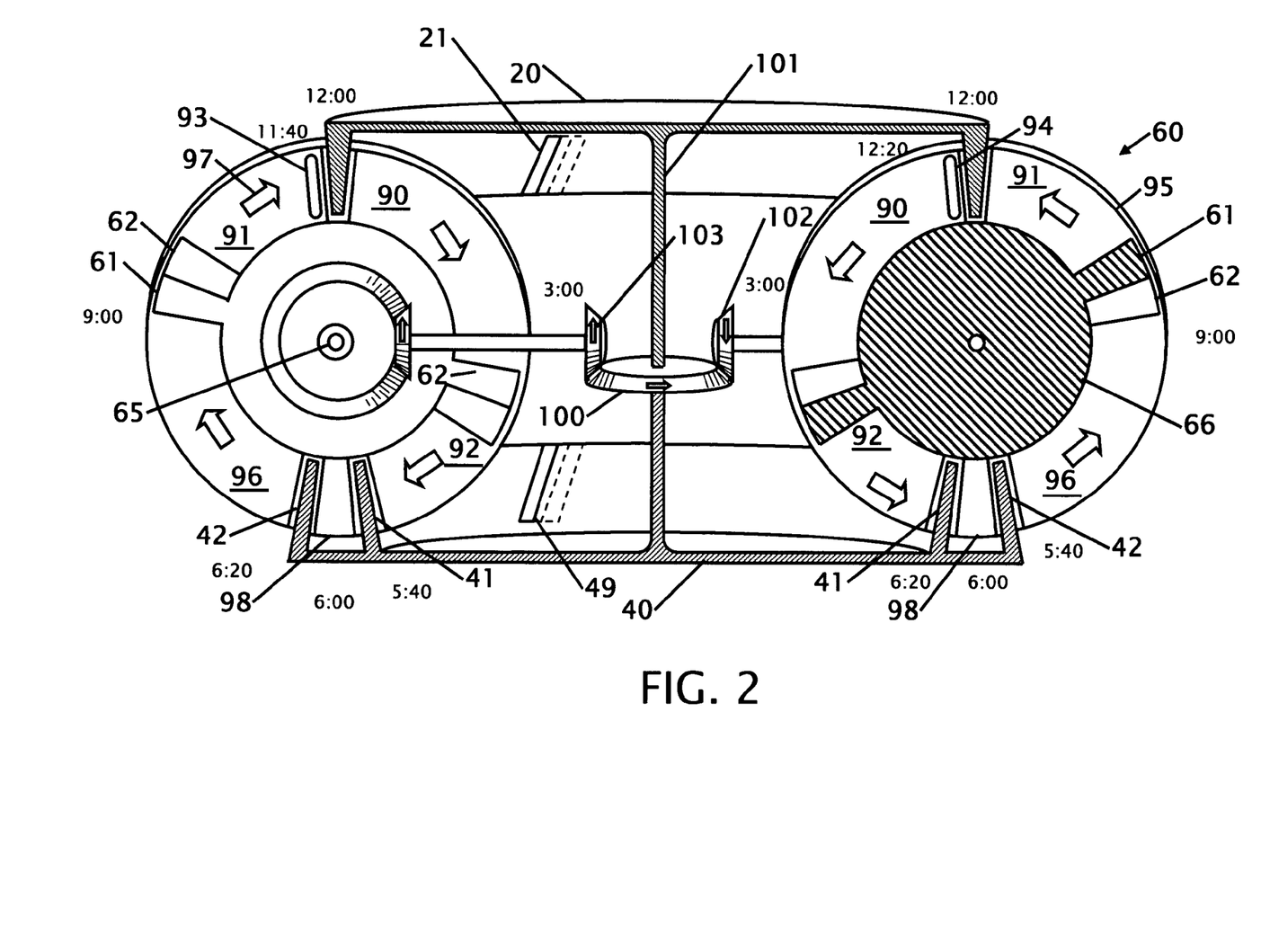
FIG. 2 shows a partial cross sectional view of one pair of opposed rotors.

FIG. 2 shows a partial cross sectional view of one pair of opposed rotors. On each rotor(s) 60, an opposed pair of pistons 61 and piston vanes 61 on each pair of opposing rotor(s) 60 that function as pistons and rotate over and to center 65 and to each other. Upper valve disk 20 and a lower valve disk 40 are two horizontal disks on a vertical shaft 101 or axis at the common center, one above the rotor and one below, support rings which are enclosed between the rotors.

As the upper valve ring 20 and the lower valve ring 40 turn they will turn the bull gear 100. The bull gear 100 will turn spur gears 102 in rotation 103. The spur gears 102 are connected to a shaft that will turn a spur gear to turn the rotors hub 66 about their center 65 with the rotor housing case 95. The opposing rotors 60 will rotate 97 in opposite directions. At the top of each rotor one side of each rotor 60 will have an intake port 94. As the piston vane 62 passes into the upper valve ring 20 the piston vane will pass through ring slot 21. After the piston vane passes through the ring slot 21 the slot 21 will pass behind the piston vane 62 and close the rotor 60. As the piston vane 62 continues to turn the air or air and gas mixture will enter into the intake 90 portion. As the piston vane 62 passes the lower valve ring 40 the compression ring gap 49 will allows the piston vane 62 to pass through the slots and seal the intake portion. The lower valve ring 40 includes two sets of rings where the inner ring is the head ring 41 and the outer ring is the compression ring 42. The opposing piston vane will enter into the top of the upper valve ring 20 and will compress 92 the air or air and gas mixture and continue to push the mixture into the ignition portion 98 where the gas and air mixture will be ignited and the piston vane 62 will be driven around the power 96 portion of the rotation. After the piston vane has cleared the ring slot 21 the opposing piston vane 61 will push the exhaust 91 out the exhaust port 93.

Figure 3:
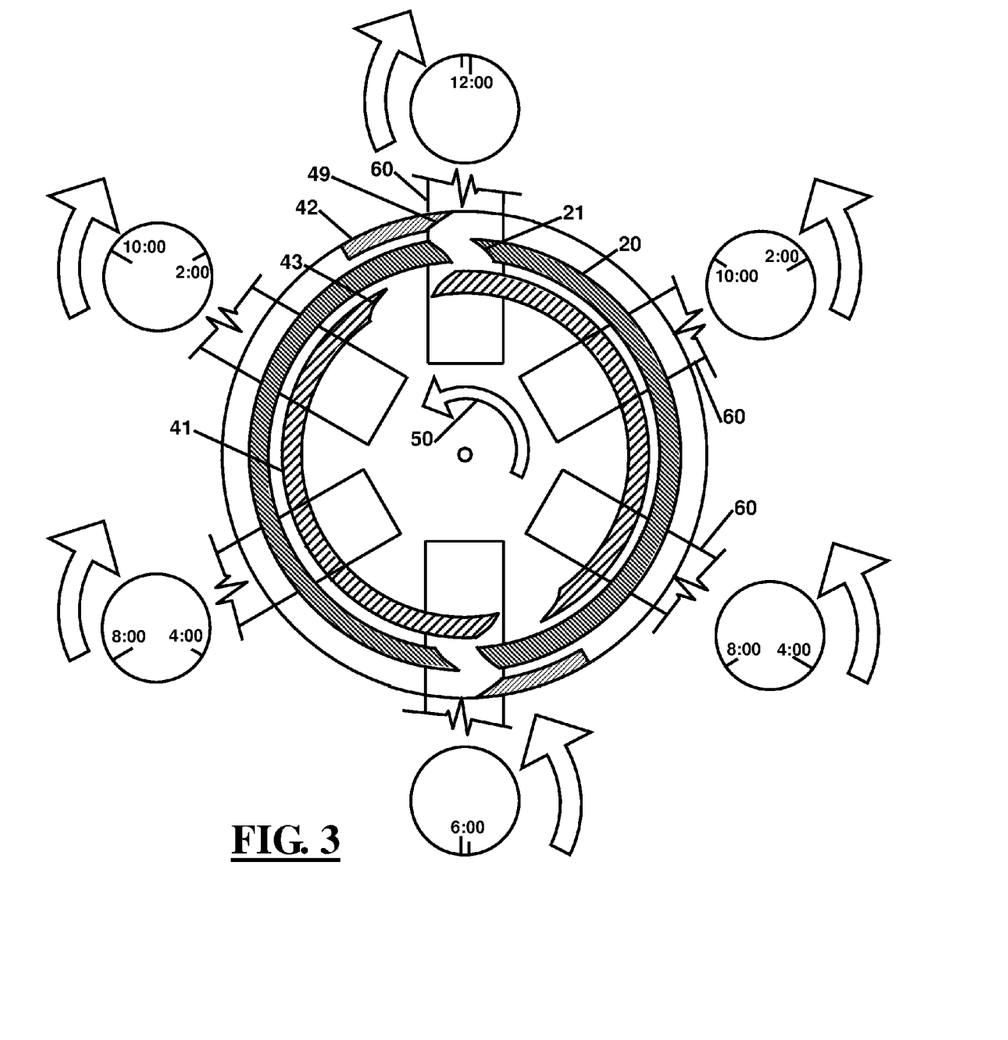
FIG. 3 shows the position of all 6 rotors

FIG. 3 shows the position of all 6 rotors. The upper valve ring and the lower valve ring are shown superimposed onto the six rotors 60. Each ring has an opposed pair of slots specific to its function and through which the pistons of each pair of opposed rotors pass simultaneously. The rotor faces are viewed as 12 hour clocks with 3:00 toward common center and 9:00 away from center. Rotors and rings rotate at the same RPM. At each 60 degrees of rotation, the pistons of the next pair of opposed rotors pass through the ring slot 21 in the upper valve ring 20, the compression ring gap 49 in the compression ring 42 and the head ring gap in the head ring 41. The valve ring is located straight up at 12:00 on the rotors. The exhaust ports begin at 11:40. Intake ports end at 12:40 (FIG. 4) Exhaust and intake ports are on opposite sides of the valve ring and opposite sides of rotor cases. A piston approaching the valve ring pushes exhaust out and then draws air in behind itself as it compresses the air drawn in by the preceding piston and pushes that compressed air through the head ring, at 5:40, to the compression ring at 6:20.

At the instant the pistons 61 of an opposed pair of rotors are at 12:00 and 6:00 and passing through the upper valve ring, the pistons of the next pair of rotors are at 10:00 and 4:00, and pistons of the $3^{rd}$ pair are at 8:00 and 2:00. Two hours on the 12 hour rotor face equals 60 degrees on the rings and on the rotors. The $2^{nd}$ half of each rotation duplicates the $1^{st}$ half with the pistons at 6:00 and 12:00, 4:00 and 10:00, and 2:00 and 8:00 which mirrors the sequence of the first half above. From 12:20 to 6:20, 180 degrees of arc, each piston 61 compresses air ahead and pulls air behind. From 5:40 to 11:40 each piston is powered by combustion behind and pushes exhaust ahead. Each rotor has 2 power arcs per rotation, one for each piston. Two power arcs occur simultaneously at each pair of opposed rotors. In this 6 rotor embodiment there are a total of 12 power arcs for each single rotation of rotors and rings.

The total power arcs per rotation equal approximately 100% of the total circular cylinder displacement. All components, rings and rotors, rotate at the same RPM. There is no change of velocity or direction. This engine is always in perfect balance.

Figure 4:
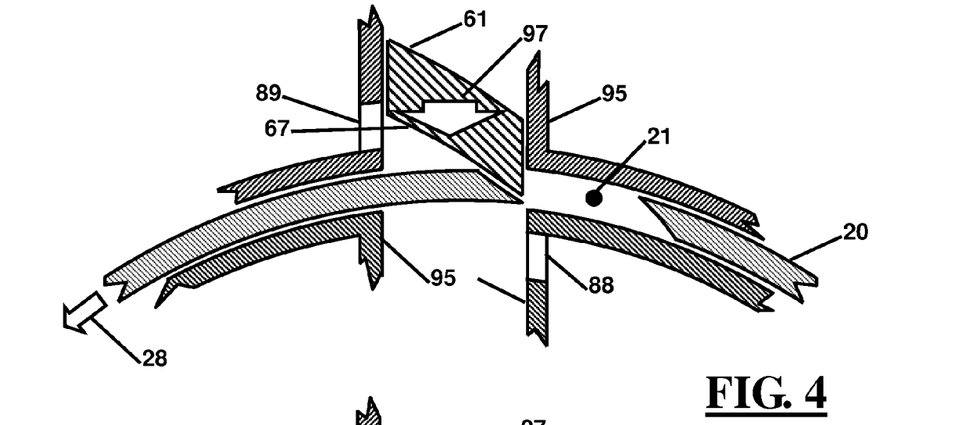
FIG. 4 shows the piston configuration of an arc through the upper valve ring with the rotor entering into the upper valve ring.
Figure 5:
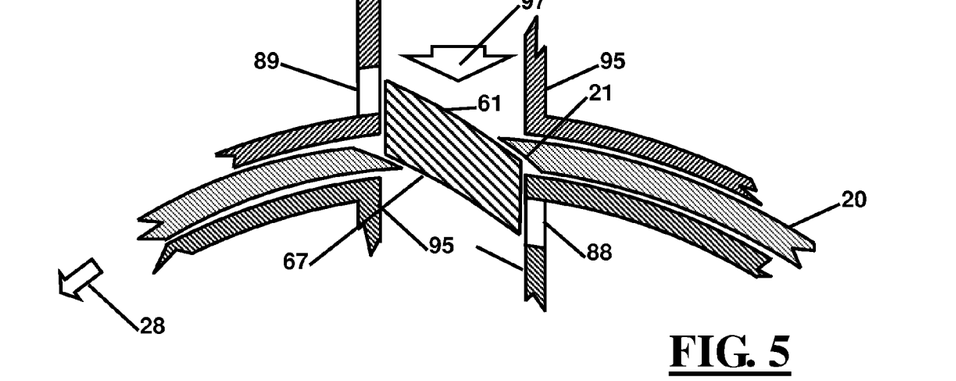
FIG. 5 shows the piston configuration of an arc through the upper valve ring with the rotor about mid-way through the upper valve ring.
Figure 6:
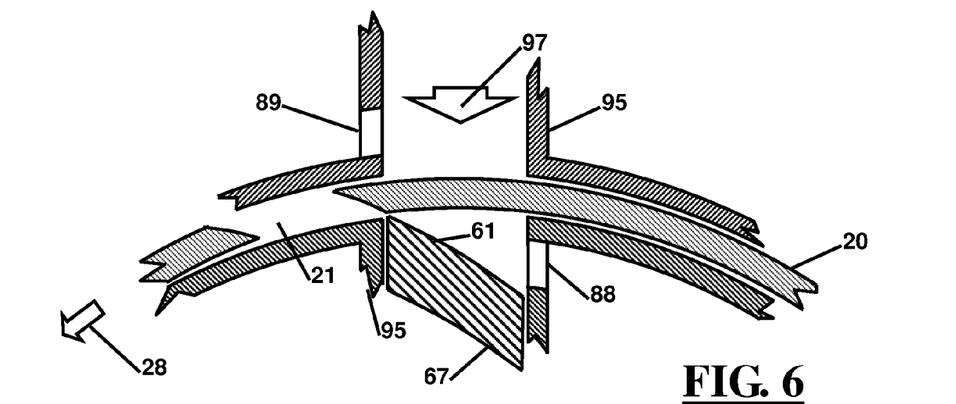
FIG. 6 shows the piston configuration of an arc through the upper valve ring with the rotor clearing the opening of the upper valve ring.

FIG. 4-FIG. 6 shows the piston configuration of an arc through the upper valve ring with the rotor at various stages of its path. In FIG. 4 the piston 61 is moving 97 into the ring slot 21 of the upper valve ring 20 as the upper valve ring 20 rotates 28. The rotation of the piston 61 moves the piston through the rotor housing case 95. The leading edge 67 of the piston 61 joins with the edge of the ring slot 21 to create a tight seal. Intake port 88 is shown on the right side of the rotor housing case 95 and the exhaust port 89 is shown on the left side of the rotor housing case 95. In FIG. 5 the piston 61 is about midway through the upper valve ring 20. In FIG. 6 the piston 61 is shown clearing the opening of the upper valve ring 20.

Figure 7:
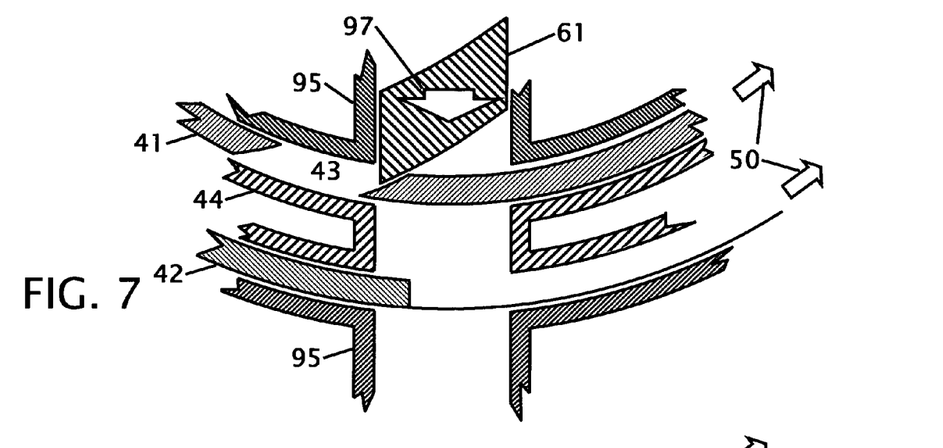
FIG. 7 shows the piston configuration of an arc through the lower valve ring with the rotor entering into the first bypass gap of the lower valve ring.
Figure 8:
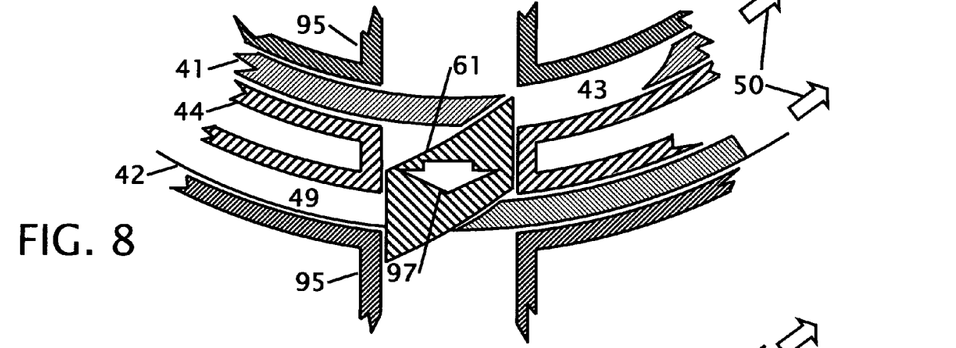
FIG. 8 shows the piston configuration of an arc through the lower valve ring with the rotor about midway through the first bypass gap and the second bypass gap of the lower valve ring.
Figure 9:
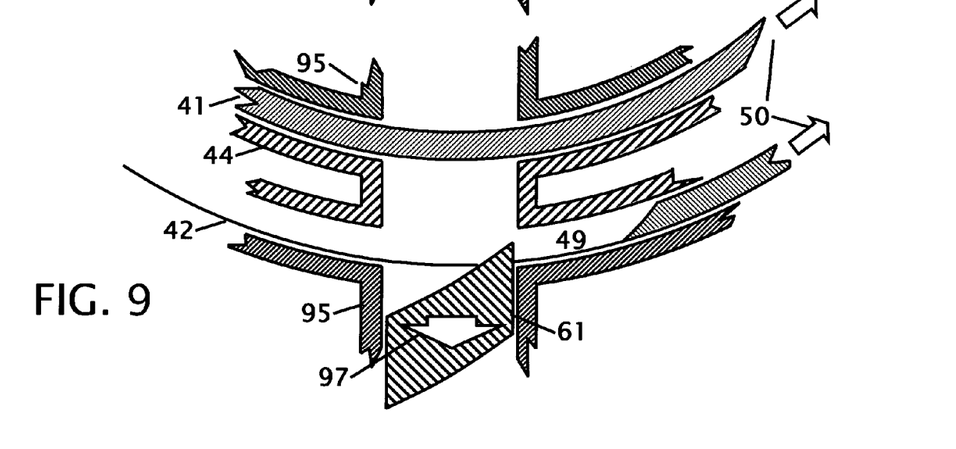
FIG. 9 shows the piston configuration of an arc through the lower valve ring with the rotor almost exiting the second bypass gap of the lower valve ring.

FIG. 7-9 shows the piston configuration of an arc through the head ring 41 and the compression ring 42 with the piston 61 at various stages of passing through the rings. In FIG. 7 the piston 61 is just entering rotation 97 into the head ring 41 and the head ring gap 43. In FIG. 8 shows the piston 61 is about mid way through the first head ring 41 and the compression ring 42. In FIG. 9 the piston 61 almost exiting the compression ring 42 of the lower valve ring 40 as the piston 61 moves into through the rotor housing case 95.

The leading face of the head ring slots 43 and 49 are gapped to enable the passage of compressed air through the head ring and momentarily contain that air between the head and compression rings as it passes over the piston tip between the two lower rings from ahead to behind the piston 61 for fuel injection, ignition, and the power stroke, now called power arc.

After ignition the piston 61 first uncovers the compression ring 42 enclosure back to the preceding rotor which is in the first half of its power arc. The piston 61 next uncovers the compression ring 42 enclosure behind the compression ring 42 as that ring moves 50 to contain compression and ignition in the succeeding rotor. Relative to rotor or circular cylinder displacement, the volume of ring enclosures between rotors is small. Those combustion gases which pass into compression ring 42 enclosures contribute to power arcs of prior and succeeding rotors.

These figures show the center of the piston tip arc is outside of the arc or circle at the valve ring to be inside at the lower head and compression rings where closer pass-through is essential, particularly as the head ring closes behind the piston. Fuel injection and ignition occur between the lower rings from points through rotor ring case 44. In this embodiment, the lateral arc of the piston 61 tip closely matches that of the rings and the rings' slots. To execute the close pass-through of the piston through the rings. The angles of the piston and the ring slots rotate or twist to match the shift of velocity from piston root to piston tip to the near constant velocity of the rings.

Figure 10:
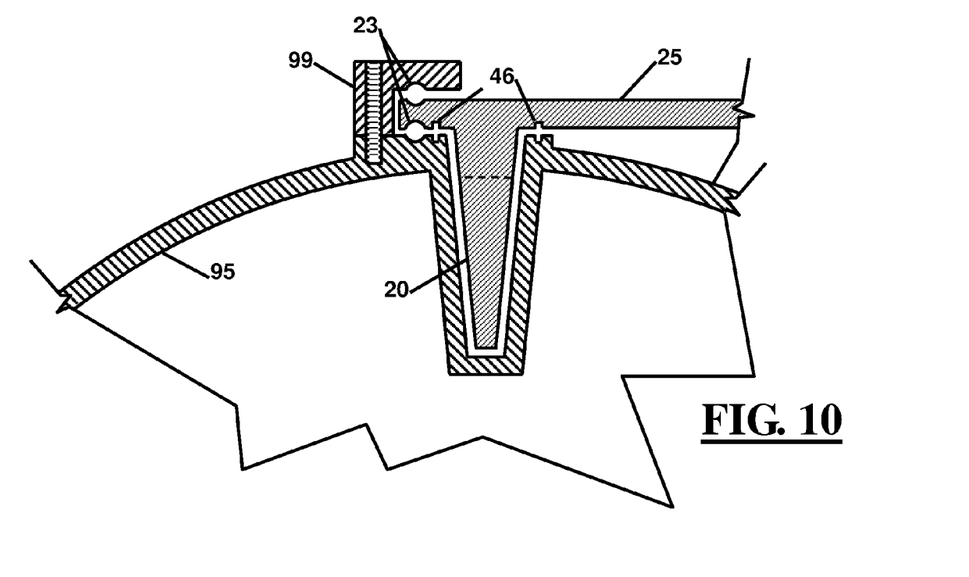
FIG. 10 shows a side sectional detail view of the upper ring.

FIG. 10 shows a side sectional detail view of the upper valve ring 20. The upper valve ring 20 is shown within the rotor housing case 95. The upper disk 25 extends to the center of rotation for the upper valve ring 20. A cap on the rotors 99 maintains the upper valve ring in position in the rotor housing case 95. A series of bearing 23 provide a bearing surface and block vertical motion of the upper valve ring 20. Seals 46 prevent leakage of air, gas and or exhaust out the sides of the upper disk 25, the cap on rotors 99 and the rotor housing case 95.

Figure 11:
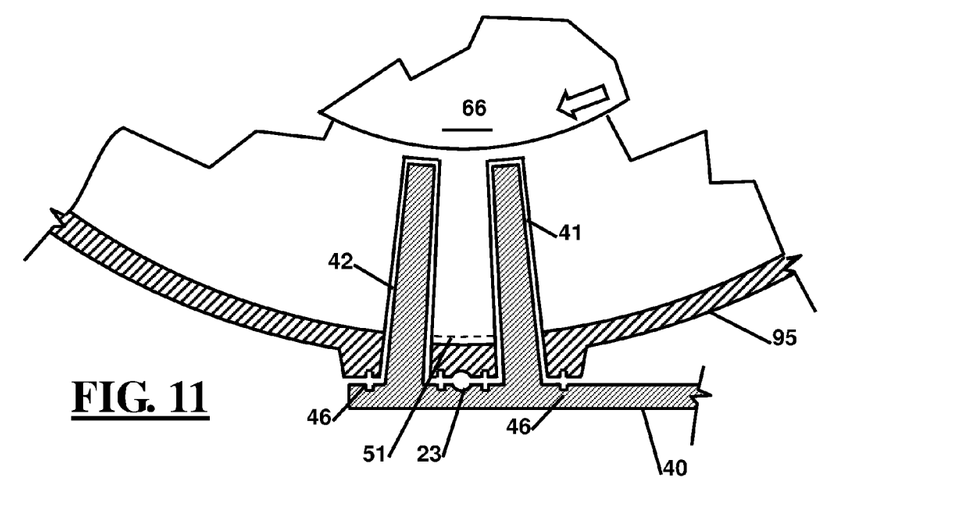
FIG. 11 shows a side sectional detail view of the lower ring.

FIG. 11 shows a side sectional detail view of the lower valve ring 40. The lower valve ring 40 is shown within the rotor housing case 95. The lower valve ring 40 has both a head ring 41 and a compression ring 42 that extends to the center of rotation for the lower valve ring 40. A series of bearing 23 provide a bearing surface and block vertical motion of the lower valve ring 40. Seals 46 prevent leakage of air, gas and or exhaust out the sides of the lower valve ring 40 and the rotor housing case 95. A piston rotates from the piston core 66 and pass over point 51 allows the piston to pass over the compressed air from behind the piston between the lower rings.

Figure 12:
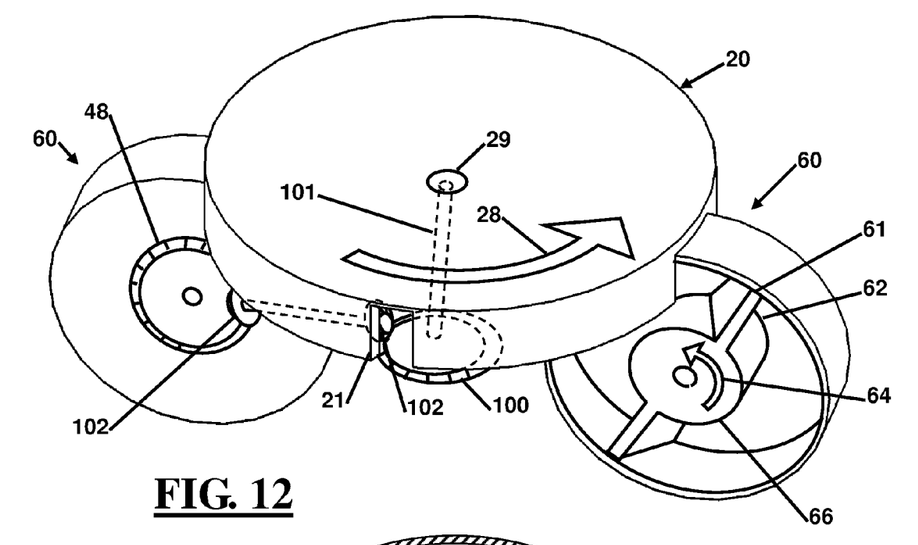
FIG. 12 shows an isometric cut-away view of a two disk rotary pump.

FIG. 12 shows an isometric cut-away view of a two disk rotary pump. The pump operates in a similar manner to the motor with the exception of the lower valve rings that are needed for detonation of the compressed air/fuel. This configuration shows only two rotors 60 whereas in the motor from FIG. 1 six rotors 60 were shown. Once again the rotor 60 on the right side is shown with the side casing removed to show the internal structure of the rotor 60. It should be obvious that a greater or lesser number of rotors 60 could be used to perform a similar motor or pumping function.

A valve upper ring 20 is located on the top and above the two rotors 60. The upper valve ring 20 has two ring slots 21 located on opposite sides of the upper ring 20. The rim of the upper valve ring 20 and the ring slots 21 pass through each of the two rotors 60 to provide an opening for air intake and air exhaust. A more detailed description of the intake and exhaust is shown and described in FIG. 4-6. The upper valve ring 20 ring rotates 28 around the center 29 in unison with the turning 64 rotor hub 66. The rotor 60 on the right side of this figure has the side closure removed to allow viewing of the internal rotor. The rotor includes a rotor hub 66 having two opposing pistons 61 with piston vanes 62 that extend from the hub 66. As the upper valve ring 20 and the lower valve ring 40 rotate a geared drive mechanism having a spur gear 102 turns the rotor gear 48. A bull gear 100 on a shaft 101 drives spur gears 102 to turn the rotor gear 48 connected to the rotor hub 66. The gear mechanism is shown and described in more detail with FIG. 2.

Figure 13:
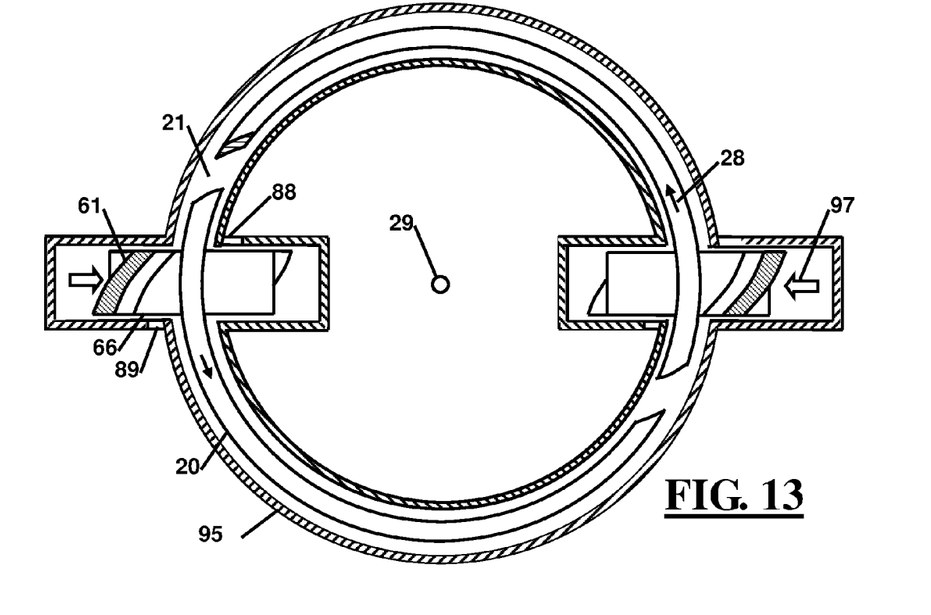
FIG. 13 shows the position of the two rotors from the pump in FIG. 12.

FIG. 13 shows the position of the two rotors from the pump in FIG. 12. The rotor hub 66 has pistons 61 that rotate 97 with the upper valve ring 20 and the upper rotation around the center 29 moves 28 the ring slot 21 around the piston 61 to create a virtual wipe within the rotor housing case 95. The piston is shown made with the left side tip as slightly behind the leading left side root to affect a scissors entry into the ring when piston front face wipes front cut of slot. With or without vanishing bevel at piston root. Piston right side tip is further behind right side root due to 21:8 ratio at piston root radius and 21:12 ratio at piston tip radius. The air pump requires the virtual wipe of both "faces," front and back, of piston. In the motor the piston curvature is reversed to enable the single face wipes by each of the lower rings which enable combustion, and only a close pass through at the common upper valve ring allowing more possible leakage. However, in the motor's back pressure at the continually open exhaust will be less than working pressure at the exhaust of the air pump reducing leakage.

Defining Pass—Throughs & Virtual Wipes

With 90 degree, straight line intersection/pass-through in the same plane, velocities of the parts moving horizontally and vertically determine the angle of their adjacent, parallel surfaces at intersection.

The rotor housing case 95 has an intake port 88 located on one side of the piston and an exhaust port 89 located on the other side of the piston 61.

In the air pump the faces are parallel, angled and twisted to virtually wipe similarly angled, twisted ring slot cuts and facilitate surface-to-surface wipe at varying piston radii. The virtual wipe that occurs on both piston faces is essential to develop and direct high pressure to the outlet port ahead of piston in the pump mode, or behind piston as an air motor or steam engine. The ring must be "virtually" impassable. Containment of pressure differentials is essential to high torque at lower RPMs. Reversed curvature disallows virtual wipe. Closest possible pass-through at upper valve ring only.

Marginal quantities of exhaust ahead of piston and combusting gasses pushing piston will pass through upper valve ring where virtual wipe of air pump was replaced by close pass-through. Virtual wipe of piston back face by back cut of head ring [at 5:40] is essential. Virtual wipe of piston front face by front cut of compression ring [at 6:20] is equally essential to contain compression for injection, ignition, and power.

Since radius of compression ring is greater than head ring, piston faces are not parallel in the motor therefore; leading, left side of piston is slightly thinner. Whether as pump, external or internal combustion, the motor or pump have common elements. In all, working fluid comes in, goes around, and is pushed out. And all use the unique combination of vertical rotors intersected by horizontal rings for positive displacement.

Each rotor has two power arcs per rotation, one for each piston. Two power arcs occur simultaneously at each pair of opposed rotors. In the 6 rotor configuration, there are a total of 12 power arcs for each single rotation of rotors and rings which displace 100% of the total volume of this engine for power. All components, rings, and rotors rotate at the same RPM. There is no change of velocity or direction. Power from each rotor is seamless and this engine is always in perfect balance.

Thus, specific embodiments of an Rotary Internal Combustion Engine have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A rotary internal combustion engine comprising:
   at least one rotor housing having a central rotor hub with opposed twisted wings forming at least one piston that extends from said central rotor hub;
   said at least one piston in rotational communication within said housing with an upper valve ring and a lower valve ring;
   said upper valve ring having a lower lip extending normal from a bottom surface and having at least two gaps in said lower lip existing on opposite sides of said lower lip;
   said lower valve ring having at least two raised lips extending normal from a top surface and having at least two gaps in each said raised lips existing on opposite sides of said raised lips; such that
   said rotational communication allows said twisted wings to pass through said at least two gaps in said lower lip and said at least two gaps in said raised lips.

2. The rotary internal combustion engine according to claim 1 wherein said at least two raise lips are concentric.

3. The rotary internal combustion engine according to claim 1 wherein said at least one rotor housing has eight rotors placed 45 degrees apart.

4. The rotary internal combustion engine according to claim 1 wherein said at least one rotor housing has six rotors placed 60 degrees apart.

5. The rotary internal combustion engine according to claim 1 wherein said at least one rotor housing has four rotors placed 90 degrees apart.

6. The rotary internal combustion engine according to claim 1 wherein said at least one rotor housing has two rotors placed 180 degrees apart.

7. The rotary internal combustion engine according to claim 1 wherein said rotational communication is with at least one gear.

8. The rotary internal combustion engine according to claim 1 wherein one of said at least two raised lips is a head ring.

9. The rotary internal combustion engine according to claim 1 wherein one of said raised lips is a compression ring.

10. The rotary internal combustion engine according to claim 1 wherein said at least one rotor housing includes an exhaust port and an intake port.

* * * * *